(12) United States Patent
Nassif et al.

(10) Patent No.: US 6,658,506 B1
(45) Date of Patent: Dec. 2, 2003

(54) METHOD AND APPARATUS FOR PERFORMING TIMING VERIFICATION OF A CIRCUIT

(75) Inventors: Nevine Nassif, Arlington, MA (US); James Arthur Farrell, Harvard, MA (US); Dale Hayward Hall, Northborough, MA (US); Gill Watt, Acton, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/292,051

(22) Filed: Apr. 14, 1999

(51) Int. Cl.[7] .............................. G06F 1/04; G06F 1/14
(52) U.S. Cl. ..................... 710/58; 713/500; 455/114; 375/296
(58) Field of Search ................... 375/296; 455/114; 710/58; 713/500

(56) References Cited

U.S. PATENT DOCUMENTS

| | | | |
|---|---|---|---|
| 4,809,162 A | * 2/1989 | Si ........................ 364/200 |
| 5,210,700 A | * 5/1993 | Tom ...................... 364/489 |
| 5,544,071 A | * 8/1996 | Keren et al. ............. 364/489 |
| 5,550,760 A | 8/1996 | Razdan et al. |
| 5,648,909 A | 7/1997 | Biro et al. |
| 5,657,239 A | 8/1997 | Grodstein et al. |
| 5,666,290 A | * 9/1997 | Li et al. ................. 364/491 |
| 5,694,579 A | 12/1997 | Razdan et al. |
| 5,719,783 A | * 2/1998 | Kerzman et al. ......... 364/488 |
| 6,038,262 A | * 3/2000 | Ganter .................. 375/296 |
| 6,046,984 A | 4/2000 | Grodstein et al. |

OTHER PUBLICATIONS

Cong, J., et al., Optimal Wiresizing Under the Distributed Elmore Delay Model, Department of Computer Science, University of California, Los Angeles, 1993, pp. 1–19.

Elmore, W., The Transient Response of Damped Linear Networks with Particular Regard to Wideband Amplifiers, Journal of Applied Physics, vol. 19, Jan. 1948, pp. 55–63.

Martin, D., et al., Delay Prediction from Resistance–Capacitance Models of General MOS Circuits, IEEE Transactions on Computer–Aided Design of Integrated Circuits and Systems, vol. 12, No. 7, Jul. 1993, pp. 997–1003.

Lin, T., et al., Signal Delay in General RC Networks, IEEE Transactions on Computer–Aided Design, vol. CAD–3, No. 4, Oct. 1984, pp. 331–349.

* cited by examiner

Primary Examiner—Jeffrey Gaffin
Assistant Examiner—Rehana Perveen
(74) Attorney, Agent, or Firm—Cesari and McKenna, LLP

(57) ABSTRACT

A system for accurately determining Elmore delays in DCVSL structures is disclosed. The system uses circuit simulation to determine models for Elmore delays through devices within specific circuit structures. The circuit structures include DCVSL circuits to accurately model performance of devices with such a structure. The system also determines discharge characteristics for DCVSL circuits using simulation. In order to determine Elmore delays, the system analyzes a circuit representation to locate DCVSL structures. The discharge characteristics and models are used to determine Elmore delays for each structure located.

13 Claims, 5 Drawing Sheets

METHOD AND APPARATUS FOR PERFORMING TIMING VERIFICATION OF A CIRCUIT

BACKGROUND OF THE INVENTION

1. Field of the Invention

The present invention relates to a timing verifier. More particularly, it relates to a timing verifier which accurately determines delays through differential cascode voltage swing logic (DCVSL) circuit structures.

2. Discussion of the Related Art

The Elmore delay, first presented in W. C. Elmore, "The Transient Response of Damped Linear Networks with Particular Regard to Wide Band Amplifier", Journal of Applied Physics, Volume 19, 55–63 (January 1948), has been used extensively as a measure of delay for RC interconnect and for MOS circuits. Given an RC tree, the Elmore delay is computed using an equation based upon the resistance and capacitance of different paths to a defined output.

Elmore delay calculations are used in timing verification of circuits. In designing circuits, it is important to rapidly identify circuit paths of concern. One method for identifying potential problems with a circuit design is by reviewing the timing of Elmore delays within the circuit. If certain circuit paths appear to have difficulties, then a circuit simulator can be used to check the path for necessary modifications. For effective verification, a timing verifier needs to identify critical circuit paths quickly. In order to do this, various models for determining Elmore delays have been created. In particular, a resistance and capacitance are used to approximate each MOS device within the circuit by a corresponding RC structure for the calculation of the Elmore delays. Algorithms have been developed to compute Elmore delays for MOS circuits. T. M. Lynn and C. A. Mead, "Signal Delay and General RC Networks", IEEE Transaction on Computer Aided Design, Vol. CAD-3,4, 331–349 (October 1984), and D. Martin and R. C. Rumin, "Delay Prediction from Resistance-Capacitance Model of General MOS Circuits", IEEE Transactions on Computer Aided Design and Integrated Circuits and Systems, Vol. No. 12, 7, 997–1003 (July 1993), disclose various procedures for estimating Elmore delays for MOS devices within a circuit. In such algorithms, the resistance and capacitance models used to approximate the MOS circuit are a great source of error in computing the Elmore delay. Part of the difficulty in determining such values is that the resistance and capacitance depend upon the structure of the circuit, not solely the device itself.

In determining Elmore delays for timing verification, it is important not to miss any critical paths. Therefore, timing verifiers typically have ignored the effect of the circuit itself on the determination of the resistance and capacitance used to represent each device. Rather, timing verifiers have relied upon determination of maximum and minimum capacitances and resistance models so that no critical paths are missed. This, however, results in highly inaccurate models and many false identifications of critical paths. Each critical path identified by the timing verifier must be further analyzed and verified using more accurate methods of circuit simulation. Therefore, many false identifications of critical paths result in significant time delays and additional work. Therefore, a need exists for more accurate determinations of Elmore delays within timing verifiers. The deficiencies of timing verifiers are further expanded when analyzing circuits with DCVSL structures, which function somewhat differently than other circuit structures. Current systems do not account for such structures, which results in extreme inaccuracies in timing calculations.

Several different types of delay models and algorithms are used by timing verifiers to compute maximum delays within a CMOS circuit. Delays can be precharacterized for standard structures. The delay is written as a function of the device size, load, and input transition time. Typically, these functions are derived from simulation data. When used in a timing verifier, precharacterized delays are accurate and easy to compute. However, precharacterized delays are only applicable to simple circuit designs and structures. With non-standard circuits, precharacterized delays cannot be used. A differential cascode voltage swing logic (DCVSL) circuit is nonstandard. Therefore, it is impractical to characterize all possible delays through a DCVSL.

Several different algorithms have been used within timing verifiers which calculate Elmore delays. Typically, these algorithms use models representing the capacitance and resistance of each MOS device within the circuit. The delays through the different devices are then combined. However, due to the structure of the DCVSL circuits, the delays computed using typical Elmore delay modeling have significant errors, even exceeding 70% of the actual delay values. Elmore delay models typically neglect the specific behavior of DCVSL circuits. This causes these models to underestimate the delay from a rising input to a falling output and to over estimate the delay from a rising input to a rising output.

FIG. 1 represents a structure for a DCVSL circuit. The DCVSL circuit has two channel-connected regions 1, 2 connected together. In considering the paths in FIG. 1 from IN_H to OUT_H, a typical Elmore delay model divides it into two parts, corresponding to each of the channel-connected regions 1, 2. In the first part, it computes the delays from IN_H to OUT_L. In the second part, it determines the delay from OUT_L to OUT_H. The delays calculated in the two parts are summed together to estimate the total delay. When computing the delay from IN_H to OUT_L, the voltage on the gates PH1 and NT3 are assumed to be rising. The typical Elmore delay model neglects the fact that the transition time at the input at PHI is different than at the input of NT3. When computing the delay from OUT_L to OUT_H, the algorithm neglects the fact that OUT_H charge through two paths to VDD. Both these facts lead to great errors in delay estimation through DCVSL circuit structures.

Circuit simulators, like SPICE, or fast circuit simulators, can also be used for timing verification. However, although they are extremely accurate, they are also extremely slow. In order to check all of the paths in the circuit with a circuit simulator would require an exorbitant amount of time.

Therefore, a need exists for a system which can accurately and quickly determine delays through DCVSL circuits.

SUMMARY OF THE INVENTION

The present invention overcomes many of the deficiencies in the prior art by providing a timing verifier which identifies DCVSL circuits and determines delays in a manner appropriate for DCVSL circuits. In particular, the present invention determines delays by estimating the discharge through each of several paths into the DCVSL circuit. Such estimates are based upon simulations which correspond to the specific structure and characteristics of the entire circuit. The delays are based upon the percentage of discharge through each of the possible discharge paths. The present invention further utilizes an improved model for generally determining Elmore delays. In particular, the improved model accounts for the DCVSL structure in estimating the charge injected by PH1 of FIG. 1. By combining the percentage of discharge through different paths with an accurate Elmore delay model the present invention is able to obtain accurate delays for DCVSL circuits.

DETAILED DESCRIPTION

Figure 2:
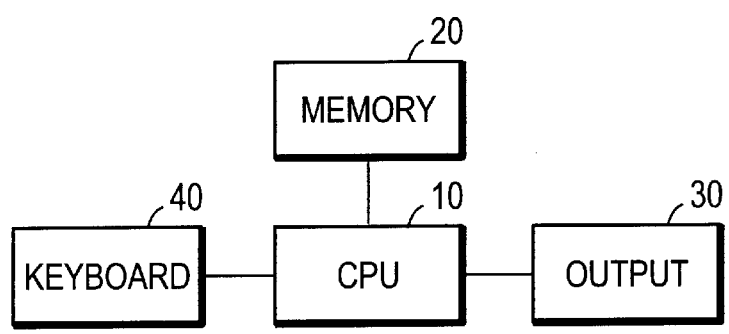
FIG. 2 is a representation of hardware which can be used to implement the present invention.

FIG. 2 represents hardware which can be used to implement the present invention. The hardware corresponds to the elements of a general purpose computer. Of course, these elements could be replaced with a special purpose computer or equivalent hardware and software elements for carrying out the processes of the present invention as discussed below. As illustrated in FIG. 2, hardware can include a central processing unit (CPU) 10 which executes digital instructions. Instructions are stored and retrieved from a memory 20 connected to the CPU 10. In addition to instructions, the memory 20 stores data used and processed by the CPU 10 in executing the instructions. A keyboard 40 is connected to the CPU 10 in order to input data or other information which can be stored in the memory 20 or used by the CPU 10. This system includes an output 30 also connected to the CPU 10. The output 30 can be of a variety of types depending upon the subsequent processing necessary for the output. For example, the output can include a display, a printer, a disk drive, or other elements for outputting magnetic or electronic information.

Figure 3:
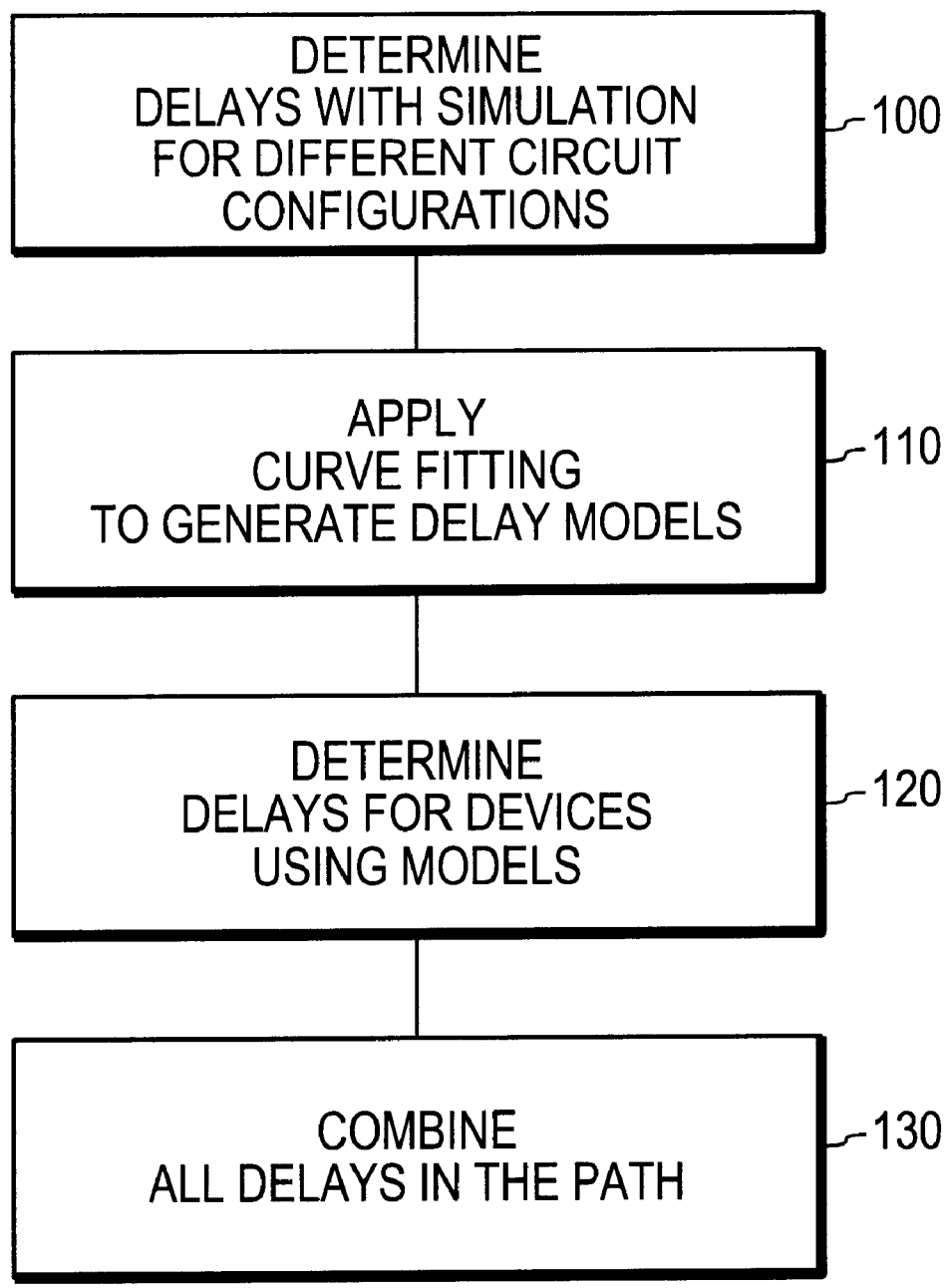
FIG. 3 is a block flow diagram which represents a process for determining Elmore delay models for MOS devices.

The present invention makes use of an improved process for determining Elmore delays through individual devices. This improved process is part of a patent application entitled "Method And Apparatus For Estimating Elmore Delays Within Circuit Designs," filed on even date herewith and incorporated herein by reference. FIG. 3 illustrates the basic steps for determining models of Elmore delays according to this improved process. At step 100, operation of general circuit structures is simulated using a circuit simulator, such as SPICE. The simulations are run using a variety of conditions for the devices within the structures. The conditions correspond to conditions of the circuit being designed. Different structures are selected and used in the simulations to represent configurations of devices with the circuit being designed. At step 110, curve fitting techniques are applied to the simulation data to determine coefficients for models of the Elmore delays for specific devices within the general structures. In particular, models are created which are functions of the circuit configuration, a capacitive load, and a width of the device. A device within a specific configuration corresponds to a model of the form:

$$tmVDD = k_2 \frac{Q}{W} + k_1 \frac{1}{W} + k_0, \tag{1}$$

where $\tau$ is the Emore delay through the device, VDD is the high voltage value for the circuit, Q is the capacitive load, and W is the width of the device. The coefficients $k_2$, $k_1$, $k_0$ are determined from the simulation data to create the models. Different models are used for different device lengths. Alternatively, a single model could be used which includes device length as another parameter.

At step 120, in the improved process, an Elmore delay is determined for each device in a discharge path using an appropriate model. The individual Elmore delays are then combined to determine the delay for the entire path (step 130).

The present invention uses individual Elmore delays for devices which form the DCVSL circuit to determine an Elmore delay through the entire DCVSL circuit. Individual Elmore delays may be determined using the process illustrated in FIG. 3 and discussed above. Any other method for determining individual Elmore delays for devices in specific configurations may also be used. In order to account for the effect of the DCVSL structure, in one embodiment of the present invention, device models are generated specifically for devices in a DCVSL-type structure. As illustrated in FIG. 3, the first step in determining delays is simulation of various circuit configurations. By performing simulations using a DCVSL configuration, more accurate models of device operation can be determined. In particular, the charge injected by PH1 is modeled more accurately than simply as a PMOS which is turning off.

Even with accurate determinations of individual Elmore delays, errors in determining a final Elmore delay through a DCVSL circuit can result from a simple combination of devices into a discharge path. The Elmore delay models and charge models used to compute the delays through a single channel connected region do not account for coupling between two channel connected regions which are connected together. Therefore, a DCVSL structure, which has two channel connected regions, is not well represented. Also, a basic combination model does not accurately account for two discharge paths. These deficiencies are overcome by the system of the present invention, which specifically accounts for multiple flows in a DCVSL circuit.

Figure 4:
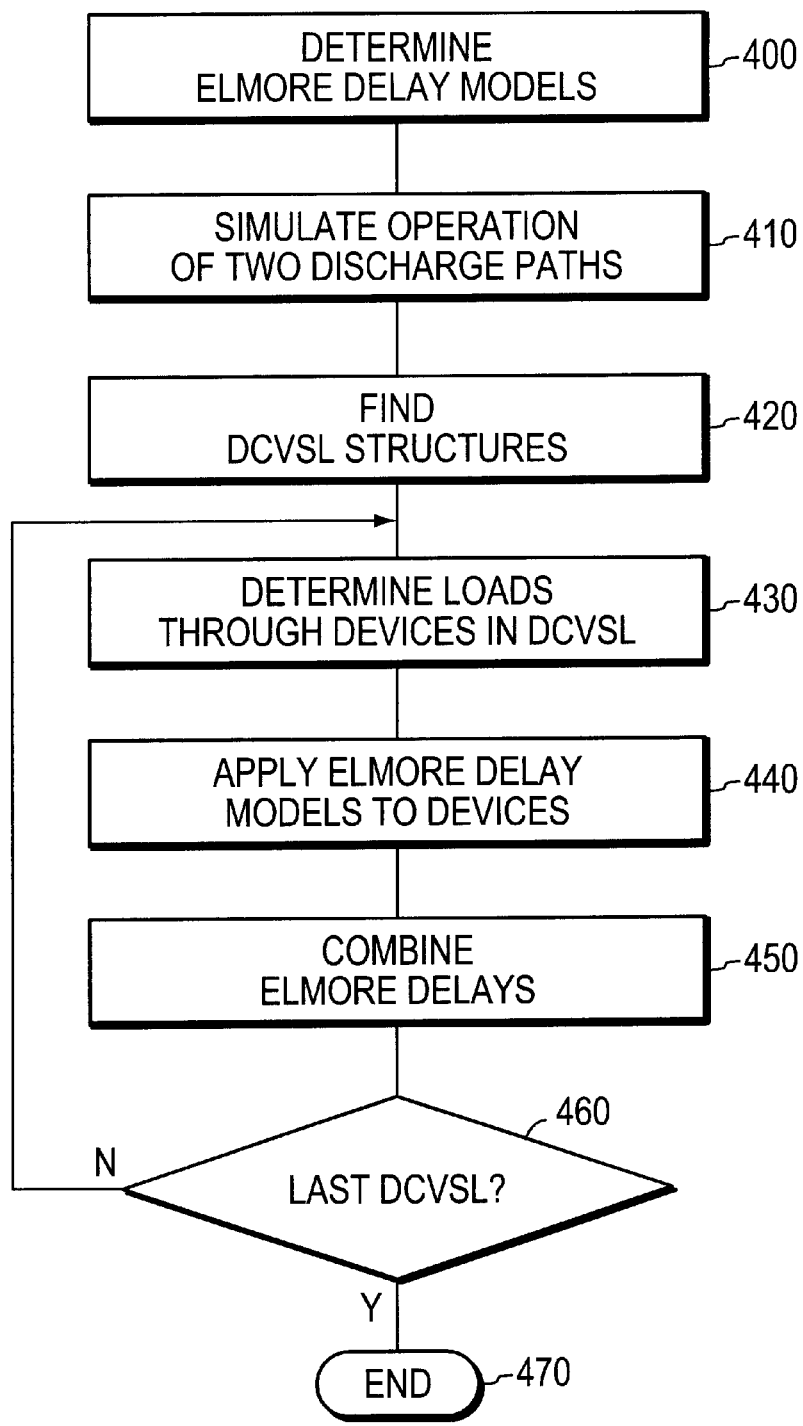
FIG. 4 is a block flow diagram which represents operation of the present invention.

Operation of the present invention, which accounts for the distinguishing functioning of a DCVSL circuit, is illustrated in FIG. 4. At step 400, the Elmore delay models applicable to the circuit being designed are determined. This step relates to the creation of Elmore delay models as discussed above and illustrated in FIG. 3. These models are used in the subsequent determination of Elmore delays, and can be performed at any time prior to the following steps.

Figure 1:
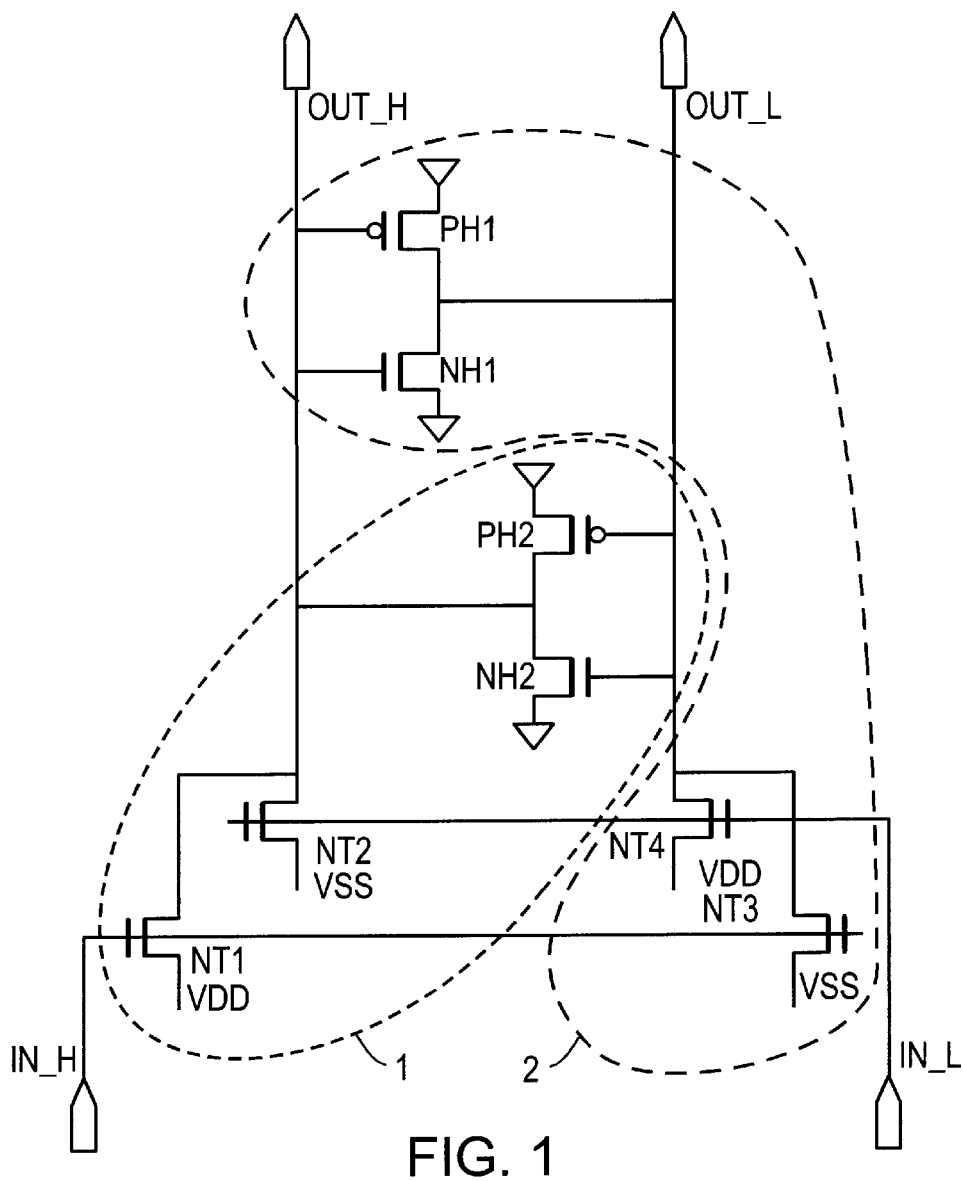
FIG. 1 illustrates the structure of a DCVSL circuit.
Figure 5:
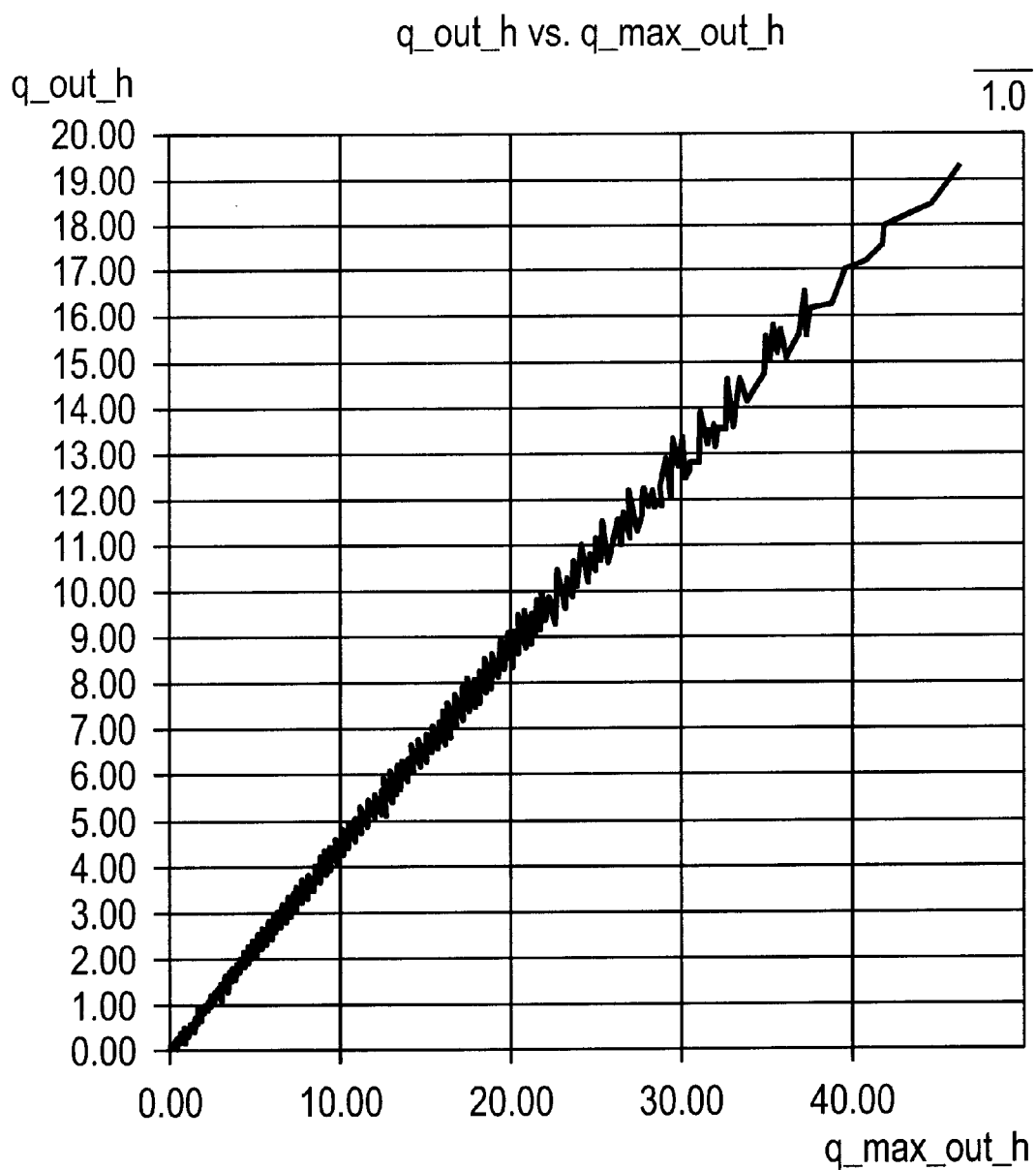
FIG. 5 is a graph illustrating simulation data produced in accordance with the present invention.
Figure 6:
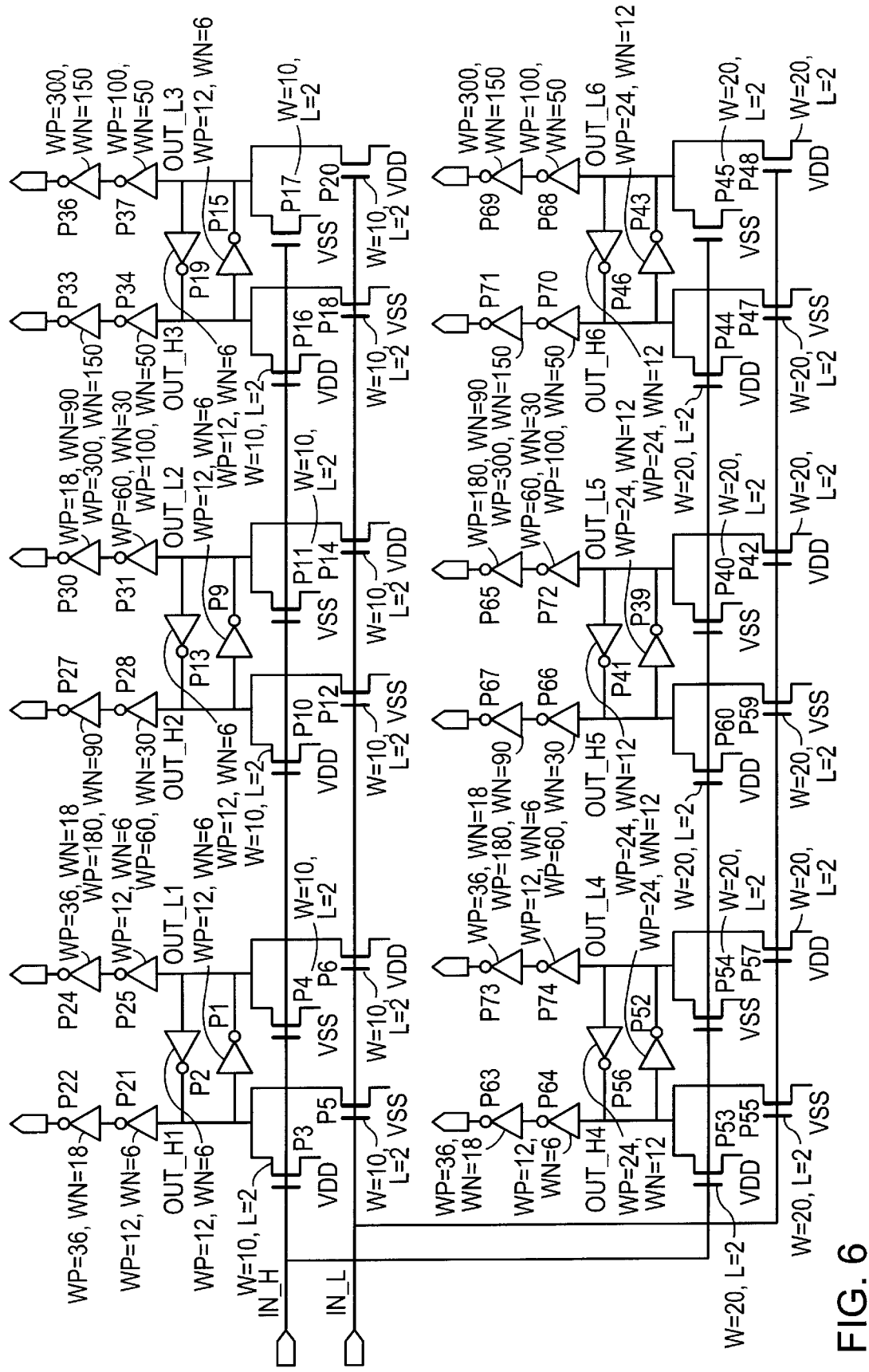
FIG. 6 illustrates DCVSL structures to which the present invention has been applied.

In addition to determining the individual Elmore delays, the system of the present invention uses simulation to determine the characteristics of operation of DCVSL circuits. At step 410, the simulations of DCVSL structures are performed using expected conditions for operation of the circuit being designed. The current flows through the DCVSL structure, as determined during simulation, are analyzed to determine a percentage of discharge through the cascode head and through the n-tree. A DCVSL circuit has a cascode head which is made up of either a pair of cross-coupled inverters or PMOS devices. Through simulations, using conditions under which a circuit will be operating and relative transistor sizes prevalent in the circuit, it is possible to estimate the parts of the charge provided through the PMOS in the cascode head, which is turning on, and the NMOS, in the n-tree, connected to it, which is also turning on. Through simulations under varying conditions, one analysis found about 43% of the charge is provided through the PMOS (PH2, FIG. 1) and the remaining charge is provided through the NMOS (NT1, FIG. 1). A graph of data generated for a simulation is shown in FIG. 5.

In order to properly account for the functioning of a DCVSL circuit, the system of the present invention must determine that such a circuit is present. At step 420, a circuit is analyzed to determine DCVSL structures. Different circuit classification tools are known for analyzing representations of circuits within a computer memory to determine certain classes of CMOS circuits. One such circuit classification tool, FirstClass, can recognize differential cascode voltage swing logic. In particular, the circuit classification tool looks for a pair of cross coupled inverters or PMOS devices. It then compares the topologies connected to each of the PMOS devices to determine whether they are complementary. If so, that portion of the circuit is considered to be a DCVSL circuit. Each DCVSL circuit is identified and then analyzed.

At steps 430–470, each DCVSL circuit is analyzed to determine an Elmore delay. First, the percentages determined during simulations in step 410 are used to calculate the total load to be provided through each device (step 430). Then, the capacitive loads are used in the individual Elmore delay models applicable to each device to determine an Elmore delay for each device (step 440). Finally, the Elmore delays are combined to determine a complete delay (step 450). The Elmore delays are calculated for each DCVSL structure identified in step 420, at which point the system terminates operation (step 470).

The system of the present invention, which identifies DCVSL structures and determines Elmore delays in a manner specific to such structures, provides greater accuracy than systems which are not specific to such structures. FIG. 4 illustrates several DCVSL structures within a circuit to which the present invention was applied. Additionally, the structures were analyzed using a SPICE circuit simulator. Tables 1A and 1B illustrate the different determinations for Elmore delay using a conventional system and the present invention, as compared to the circuit simulator. With the present invention, the results were significantly more accurate. Furthermore, the present invention did not underestimate delays, which would cause path violations to be missed.

TABLE 1A

Falling delays from IN_H rising to OUT_L1, OUT_L6 falling

| Device | SPICE | Conventional System | | DCVSL Specific System | |
|---|---|---|---|---|---|
| OUT_L1 | 174 ps | 156 ps | −10% | 201 ps | 16% |
| OUT_L2 | 218 ps | 213 ps | −2% | 258 ps | 18% |
| OUT_L3 | 256 ps | 260 ps | 2% | 306 ps | 20% |
| OUT_L4 | 132 ps | 116 ps | −12% | 152 ps | 15% |
| OUT_L5 | 153 ps | 142 ps | −7% | 179 ps | 17% |
| OUT_L6 | 170 ps | 166 ps | −2% | 202 ps | 19% |

TABLE 1B

Rising delays from IN_H rising to OUT_L1, OUT_L6 rising

| Device | SPICE | Conventional System | | DCVSL Specific System | |
|---|---|---|---|---|---|
| OUT_H1 | 249 ps | 451 ps | 81% | 319 ps | 28% |
| OUT_H2 | 328 ps | 639 ps | 95% | 431 ps | 31% |

TABLE 1B-continued

Rising delays from IN_H rising to OUT_L1, OUT_L6 rising

| Device | SPICE | Conventional System | | DCVSL Specific System | |
|---|---|---|---|---|---|
| OUT_H3 | 398 ps | 796 ps | 100% | 525 ps | 32% |
| OUT_H4 | 185 ps | 311 ps | 68% | 229 ps | 24% |
| OUT_H5 | 221 ps | 401 ps | 81% | 282 ps | 28% |
| OUT_H6 | 251 ps | 476 ps | 90% | 327 ps | 30% |

Having thus described at least one embodiment, alterations, modifications and changes to the invention will be readily apparent to those of skill in this industry. Such modifications and changes are intended to be within the scope of the invention which is only limited by the claims appended here too.

What is claimed is:

1. A timing verification system including representation of a circuit comprising:
   load determining means for determining a load corresponding to each of two paths through the at least one DCVSL structure within the circuit;
   delay determining means for determining a path Elmore delay for each of the two paths based upon the determined loads; and
   adding means for combining the path Elmore delays for each of the two paths to determine a Elmore delay for the at least one DCVSL structure.

2. The timing verification system of claim 1, further comprising structure locating means for locating DCVSL structures within the circuit.

3. The timing verification system of claim 1, further comprising:
   model selection means for selecting an Elmore delay model, from a plurality of Elmore delay models, for each of a plurality of devices within the at least one DCVSL structure; and
   wherein the delay determining means determines the path Elmore delay based upon the Elmore delay models selected for the plurality of devices.

4. The timing verification system of claim 3, wherein the model selection means selects the Elmore delay models from a plurality of Elmore delay models specific to devices in a DCVSL structure.

5. A timing verification system including representation of a circuit comprising:
   means for estimating proportions of a single load discharged through each of two paths through at least one DCVSL structure within the circuit;
   means for determining a load corresponding to each of the two paths, the loads based upon proportions determined by the estimating means;
   means for determining a path Elmore delay for each of the two paths based upon the determined loads; and
   means for combining the path Elmore delays for each of the two paths to determine an Elmore delay for the at least one DCVSL structure.

6. The timing verification system of claim 5, wherein the load estimating means includes:
   simulation means for simulating loads through a DCVSL structure under a variety of conditions; and
   proportioning means for estimating the proportions based upon the simulated loads.

7. The timing verification system of claim 1, wherein each of the two paths of the at least one DCVSL structure is a channel connected region.

8. A method of timing verification for a circuit comprising the steps of:
- determining a load corresponding to each of two paths through the at least one DCVSL structure within the circuit;
- determining a path Elmore delay for each of the two paths based upon the determined loads; and
- combining the path Elmore delays for each of the two paths to determine a Elmore delay for the at least one DCVSL structure.

9. The method of claim 8, further comprising the step of analyzing the circuit to locate DCVSL structures within the circuit.

10. The method of claim 8, further comprising the step of selecting an Elmore delay model, from a plurality of Elmore delay models, for each of a plurality of devices within the at least one DCVSL structure; and
- wherein the path Elmore delays are based upon the Elmore delay models selected for the plurality of devices.

11. A method of timing verification for a circuit comprising the steps of:
- estimating proportions of a single load discharged through each of two paths through at least one DCVSL structure within the circuit;
- determining a load corresponding to each of the two paths, the loads based upon the estimated proportions;
- determining a path Elmore delay for each of the two paths based upon the determined loads; and
- combining the path Elmore delays for each of the two paths to determine an Elmore delay for the at least one DCVSL structure.

12. The timing verification system of claim 11, wherein the estimation step includes the steps of:
- simulating loads through a DCVSL structure under a variety of conditions; and
- estimating the proportions based upon the simulated loads.

13. A computer readable media comprising:
- the computer readable media containing computer executable instructions for execution in a processor for the practice of the method of claim 8 or claim 11.

* * * * *